(12) United States Patent
Krude et al.

(10) Patent No.: US 7,980,157 B2
(45) Date of Patent: Jul. 19, 2011

(54) DIFFERENTIAL ASSEMBLY WITH WELDED DIFFERENTIAL CARRIER

(75) Inventors: Werner Krude, Neunkirchen-Seelscheid (DE); Michael Engelmann, Sankt Augustin (DE); Boris Kracheninnikov, Hürth (DE)

(73) Assignee: GKN Driveline International GmbH, Lomar (DE)

( * ) Notice: Subject to any disclaimer, the term of this patent is extended or adjusted under 35 U.S.C. 154(b) by 677 days.

(21) Appl. No.: 11/794,244

(22) PCT Filed: Dec. 27, 2004

(86) PCT No.: PCT/EP2004/014721
§ 371 (c)(1),
(2), (4) Date: May 12, 2008

(87) PCT Pub. No.: WO2006/074680
PCT Pub. Date: Jul. 20, 2006

(65) Prior Publication Data
US 2009/0082161 A1    Mar. 26, 2009

(51) Int. Cl.
*F16H 57/02* (2006.01)
(52) U.S. Cl. .................................................. 74/606 R
(58) Field of Classification Search ............... 74/606 R, 74/650, 607; 475/242
See application file for complete search history.

(56) References Cited

U.S. PATENT DOCUMENTS

| | | | |
|---|---|---|---|
| 2,350,459 A * | 6/1944 | Hillcoat et al. | 475/230 |
| 2,769,353 A * | 11/1956 | Nash | 475/234 |
| 3,202,466 A | 8/1965 | Kaptur | |
| 4,125,026 A * | 11/1978 | Torii et al. | 475/230 |
| 5,041,069 A * | 8/1991 | Horst | 475/231 |
| 5,234,388 A * | 8/1993 | Nordkvist | 475/246 |
| 5,472,385 A * | 12/1995 | Vu | 475/251 |
| 6,061,907 A | 5/2000 | Victoria et al. | |
| 7,244,211 B2 | 7/2007 | Bostbarge | |
| 2005/0037888 A1 | 2/2005 | Bostbarge | |

(Continued)

FOREIGN PATENT DOCUMENTS

DE    2 359 828    10/1974

(Continued)

OTHER PUBLICATIONS

English Translation of DE 10059684 A1 to Suchandt et al., Germany, Jun. 2002.*

(Continued)

*Primary Examiner* — Justin Holmes
(74) *Attorney, Agent, or Firm* — Rader, Fishman & Grauer, PLLC

(57) ABSTRACT

A differential assembly includes a differential carrier (5) with a first carrier part (6) with a free first annular face (13) and a second carrier part (7) connectable to the first carrier part (6) and having a free second annular face (15), and a plurality of circumferentially distributed recesses (9) formed between the two carrier parts (6, 7); per carrier part (6, 7), a sideshaft gear (22, 23) is rotatably supported therein; and a supporting element (10) with journals (12) is held in the differential carrier (5). Each of the journals engages one of the recesses (9) of the differential carrier (5) and carries a differential gear (19) for driving the sideshaft gears (22, 23). The first and the second carrier part (7) are welded along a joining region formed between the two annular faces (13, 15) which is interrupted by the recesses (9) in the circumferential direction.

13 Claims, 5 Drawing Sheets

U.S. PATENT DOCUMENTS

2007/0032334 A1 * 2/2007 Green .......................... 475/230

FOREIGN PATENT DOCUMENTS

| | | |
|---|---|---|
| DE | 2 656 863 | 9/1977 |
| DE | 43 14 503 | 12/1994 |
| DE | 100 59 684 | 6/2002 |
| DE | 699 01 373 T2 | 10/2002 |
| DE | 102 38 236 | 3/2004 |
| EP | 0 864 779 | 9/1998 |
| EP | 1 219 865 | 7/2002 |
| WO | WO-03/031843 A1 | 4/2003 |

OTHER PUBLICATIONS

English Translation of DE 2656863 A1 to Nussbaumer, Germany, Sep. 1997.*

* cited by examiner

US 7,980,157 B2

DIFFERENTIAL ASSEMBLY WITH WELDED DIFFERENTIAL CARRIER

TECHNICAL FIELD

The invention relates to a differential assembly which forms part of a differential drive and, more particularly, serves to be used in the driveline of a motor vehicle. Such differential assemblies are sufficiently known. They commonly comprise a differential carrier in which, on an axis of rotation, there are arranged sideshaft gears which, for torque transmitting purposes, can be connected to associated sideshafts. The sideshaft gears are driven via differential gears which rotate together with the differential carrier and which are supported so as to be rotatable around journal axes positioned radially relative to the axis of rotation.

U.S. Pat. No. 3,202,466 discloses a bevel gear differential with a plurality of differential gears rotating together with the differential carrier and sideshaft gears engaging same. The differential gears are rotatably held on radial journals which are inserted into bores of the differential carrier. The differential carrier is provided in two parts, with the separating region adjoining the central plane. The two housing parts are connected to one another via a flange connection. A similar differential assembly is known from EP 0 864 779 B1 wherein the journals carrying the differential gears are held in longitudinal grooves of the differential carrier. In the differential assembly known from WO 03/031843 A1, the journals are received in corresponding bearing blocks which, in turn, engage longitudinal grooves of the differential carrier.

From DE 102 38 236 A1, there is known a differential assembly with a two-part differential carrier which comprises a dish-shaped carrier part and cover-shaped carrier part. The two carrier parts are connected to one another by laser welding.

DE 2 359 828 shows a differential assembly with a three-part differential carrier which comprises two outer parts and an intermediate sleeve part in which the journal is received in corresponding bores. The two carrier parts are connected to one another by electron beam welding.

SUMMARY OF THE INVENTION

It is an object of the present invention to propose a differential assembly, more particularly for being used in the driveline of a motor vehicle, which is compact in design and which, at the same time, can be produced in a simple and cost-effective way.

The invention provides a differential assembly, more particularly for use in the driveline of a motor vehicle, comprising a differential carrier which is rotatingly drivable around an axis of rotation A and which comprises a dish-shaped first carrier part with a free first annular face and a dish-shaped second carrier part being connectable to the first carrier part and having a free second annular face, wherein a plurality of circumferentially distributed recesses is formed between the first carrier part and the second carrier part;
a supporting element held in the differential carrier and having a plurality of journals, wherein each of the journals engages one of the recesses of the differential carrier and rotatably carries a differential gear for driving two sideshaft gears; wherein the first and the second carrier part are connected to one another by welding along a joining region formed between the first annular face and the second annular face, wherein the weld formed in this way is interrupted by the recesses in the circumferential direction.

This solution allows the differential carrier to be produced without any threaded connections and without further setting measures and aligning measures for the individual components relative to one another. The individual components are centered automatically relative to one another, the advantage being that by welding the two carrier parts to one another, it is possible to save production and assembly stages, so that the overall production costs can be reduced. Because the weld is located in the region of the recesses of the differential carrier, the complexity of the two carrier parts is negligible.

According to one embodiment, the recesses for receiving the journals are formed in the first carrier part only, extend from the free first annular face in the axial direction and interrupt said first annular face. This results in a simple design of the second carrier part whose second annular face is preferably closed continuously. Furthermore, it is proposed that the first carrier part comprises a flange for introducing torque into the differential carrier. This is advantageous in that the torque can be introduced directly from the first carrier part into the supporting element. The weld is positioned outside the torque flow.

According to a concrete particular embodiment, the first carrier part and the second carrier part are designed in such a way that the weld is arranged so as to be axially offset relative to the supporting element, with the weld preferably comprising a minimum axial distance from the supporting element. The axial offset ensures that the second carrier part can comprise a smooth annular face without any axial cuts. With reference to the axis of rotation A, the weld is positioned in a radial plane.

According to a further embodiment, the second carrier part comprises an annular recess into which the first carrier part can be introduced by means of a cylindrical projection, with centering being effected between the cylindrical projection of the first carrier part and the annular recess of the second carrier part. In this way it is ensured that the first carrier part and the second carrier part are radially centered relative to one another during assembly.

It is proposed that the first annular face and/or the second annular face are/is conical in shape. This is advantageous in that there is formed a sufficiently large V-gap for the weld. For welding purposes, any standard welding method can be applied. If electron beam or laser welding is used, the first annular face and the second annular face can also be positioned in radial planes and abut one another in a planar way.

According to another embodiment, the differential assembly is provided in the form of a crown gear differential, with the sideshaft gears being provided in the form of crown gears and the differential gears in the form of spur gears. The first sideshaft gear is rotatably supported in the first carrier part and serves to transmit torque to a first sideshaft to be connected. The second sideshaft gear is rotatably supported in the second carrier part and serves to transmit torque to a second sideshaft to be connected. Using a crown gear differential is advantageous in that the forces transmitted from the differential gears to the crown gears, with reference to the journal axis B, comprise only a radial force component. There are no axial force components in the direction of the journal axis B which would have to be accommodated by the differential carrier. The wear at the contact faces between the differential gears and the differential carrier is thus minimized. However, this embodiment does not mean that the inventive differential assembly is limited to crown gear differentials. On the contrary, the inventive idea can easily be transferred to bevel gear differentials wherein the differential gears and sideshaft gears are provided in the form of bevel gears.

There are preferably provided at least three differential gears, with the supporting element being centered via the meshing engagement of the differential gears and the sideshaft gears on the axis of rotation A. For lubrication purposes, the journals of the supporting element comprise flattened portions which extend parallel to the journal axis B. In a preferred embodiment, the journals are held in the recesses with axial play in the direction of the axis of rotation A, so that the differential gears can set themselves centrally between the sideshaft gears. The tooth play of the teeth between the differential gears and the sideshaft gears can thus be set so as to be symmetric.

According to yet another embodiment, each of the two sideshaft gears comprises an axially projecting hub to be able to transmit torque to the respective sideshaft, with the hub partially projecting into a central aperture of the supporting element, with an annular radial gap being formed between the hub and the supporting element. The annular gap and the longitudinal extension of the recesses make it possible for the supporting element with its differential gears to set itself freely relative to the sideshaft gears. This measure permits tolerances to be rough, which has a positive effect on the production costs.

According to a further embodiment, at least one of the sideshaft gears is rotatingly supported in the differential carrier by means of a rolling contact bearing. This applies if a sideshaft gear supported in the differential carrier is connected to an outer joint part of a constant velocity universal joint. Using a rolling contact bearing at the sideshaft gear connected to the constant velocity universal joint is advantageous in that the forces occurring can be introduced into and supported by the differential carrier. The constant velocity universal joint is preferably provided in the form of a tripode joint.

Preferred embodiments will be described below with reference to the drawings wherein

DETAILED DESCRIPTION OF THE DRAWINGS

Figure 1:
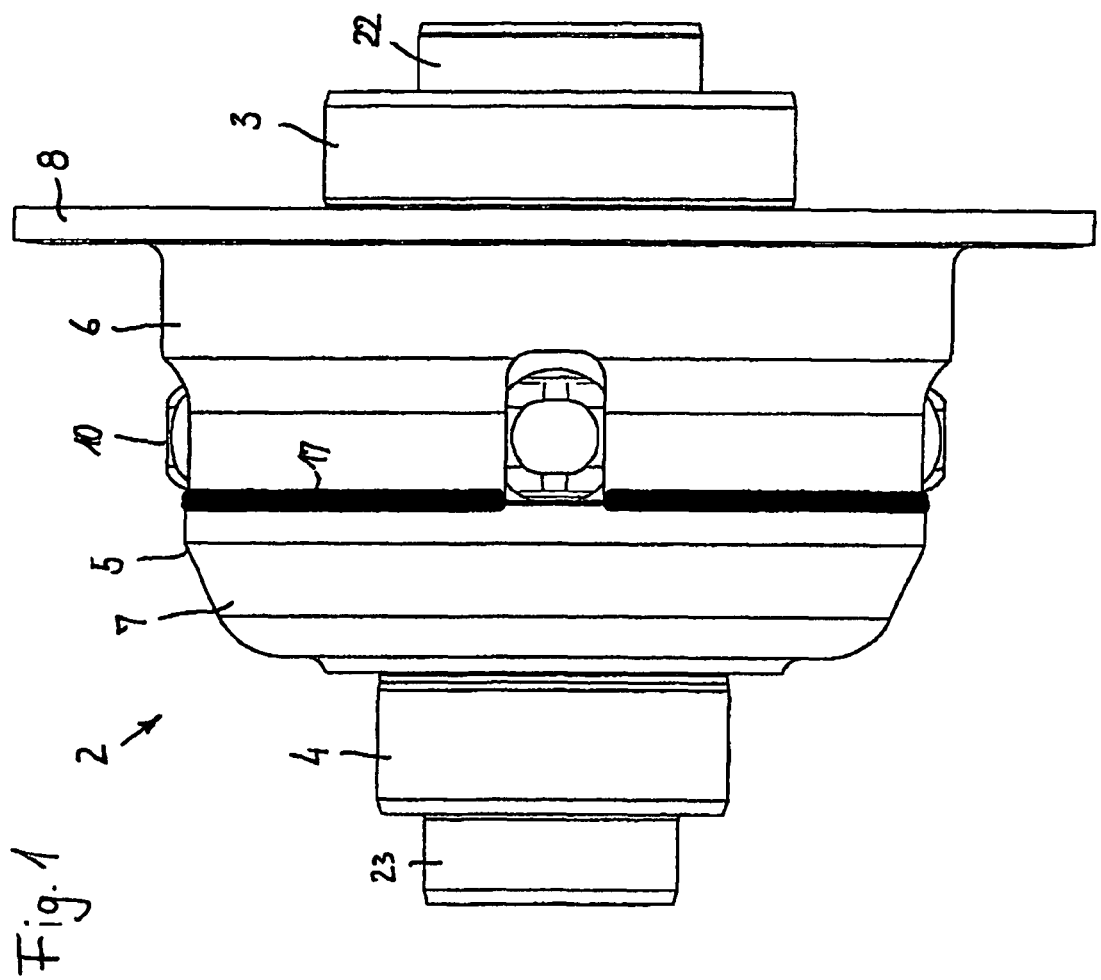
FIG. 1 is a radial view of an inventive differential assembly.

FIG. 1 shows an inventive differential assembly 2 comprising bearing portions 3, 4 to provide support in a stationary drive housing (not illustrated). The differential assembly 2 serves to transmit torque from a driveshaft in a driveline in a motor vehicle (not illustrated) via two sideshaft gears to an associated sideshaft. FIG. 1 shows the hubs 24, 25 connected to the sideshaft gears. The differential assembly 2 comprises a differential carrier 5 which is rotatable around an axis of rotation A and which comprises a first carrier part 6 and a second carrier part 7 which are welded to one another. The first carrier part 6 comprises an integrally formed-on flange 8 to which there can be connected a ring gear 11 (shown in FIG. 5 only) for transmitting torque into the differential carrier 5. In the first carrier part 6 there are provided axially extending recesses 9 which can be engaged by a supporting element 10 by means of its journals 12.

Figure 2:
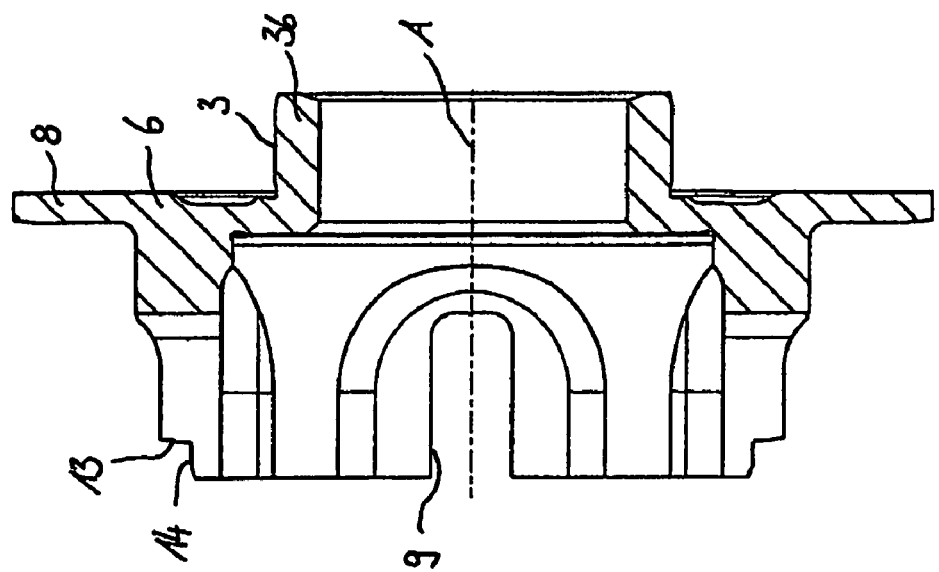
FIG. 2 shows the differential carrier according to FIG. 1 in a longitudinal section.
Figure 2:
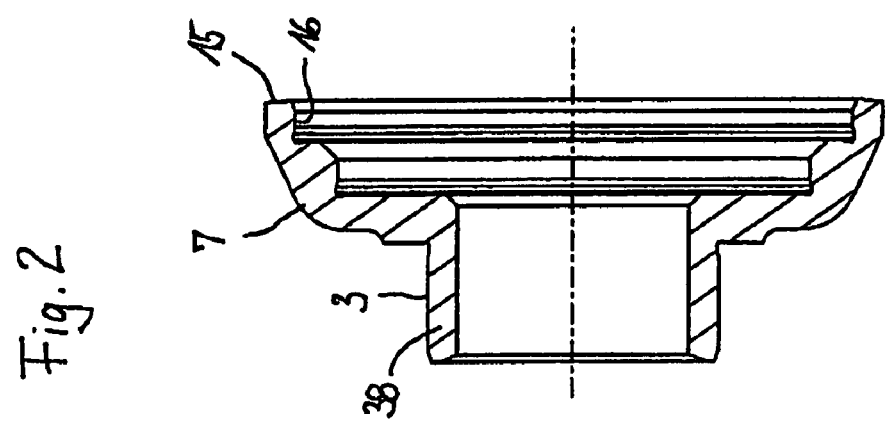

The differential carrier 5 has a first carrier part 6 and a second carrier part 7 and is shown in FIG. 2 in which it is possible to see the recesses 9 for being engaged by the journals 12 for torque transmitting purposes. The first carrier part 6 comprises a first annular face 13 substantially positioned in a radial plane with reference to the axis of rotation A, and an adjoining cylindrical projection 14. The second carrier part 7 comprises a second annular face 15 positioned opposite the first annular face 13, and an adjoining annular recess 16. For assembly purposes, the second carrier part 6 with its annular recess 16 is slid onto the cylindrical projection 14 of the first carrier part 7. The annular recess 16 opposite the cylindrical projection 14 is designed in such a way that the first and the second carrier part 6, 7 are jointly centered on the axis of rotation A. The two annular faces 15, 16 positioned opposite one another are both slightly conical so that, between same, there is formed a V-shaped join if viewed in a longitudinal section. The shape of the join depends on the welding method used. After the differential assembly 2 has been produced, the weld 17 is formed in said join. To produce the weld 17 between the first carrier part 6 and the second carrier part 7, a welding device (not illustrated) is directed towards the join, and the differential carrier 5 is rotated around its axis of rotation A, with the circumferential regions in which there are provided the recesses 9 being saved.

Figure 3:
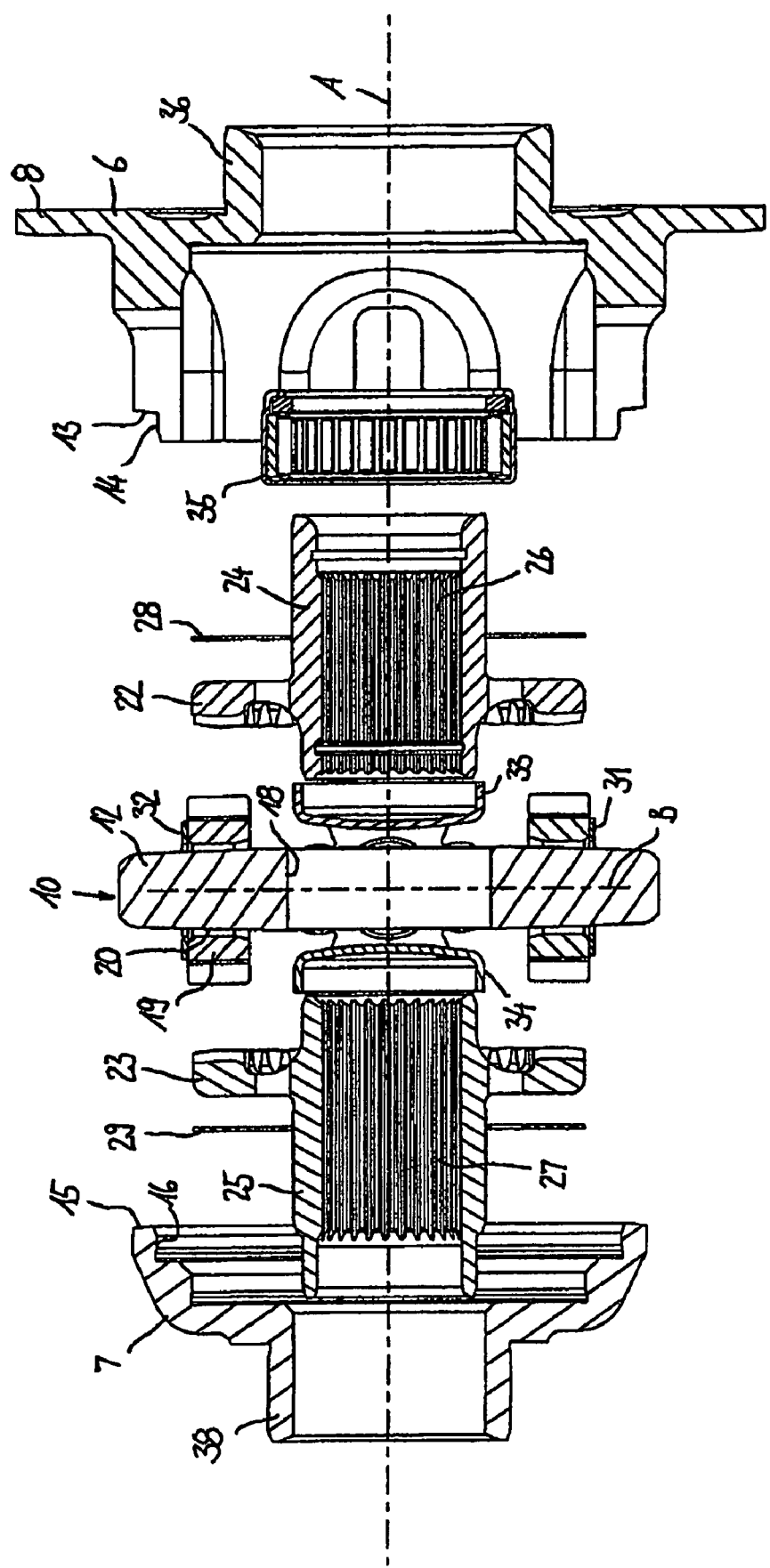
FIG. 3 is an exploded view of the differential assembly according to FIG. 1 in a longitudinal section.
Figure 4:
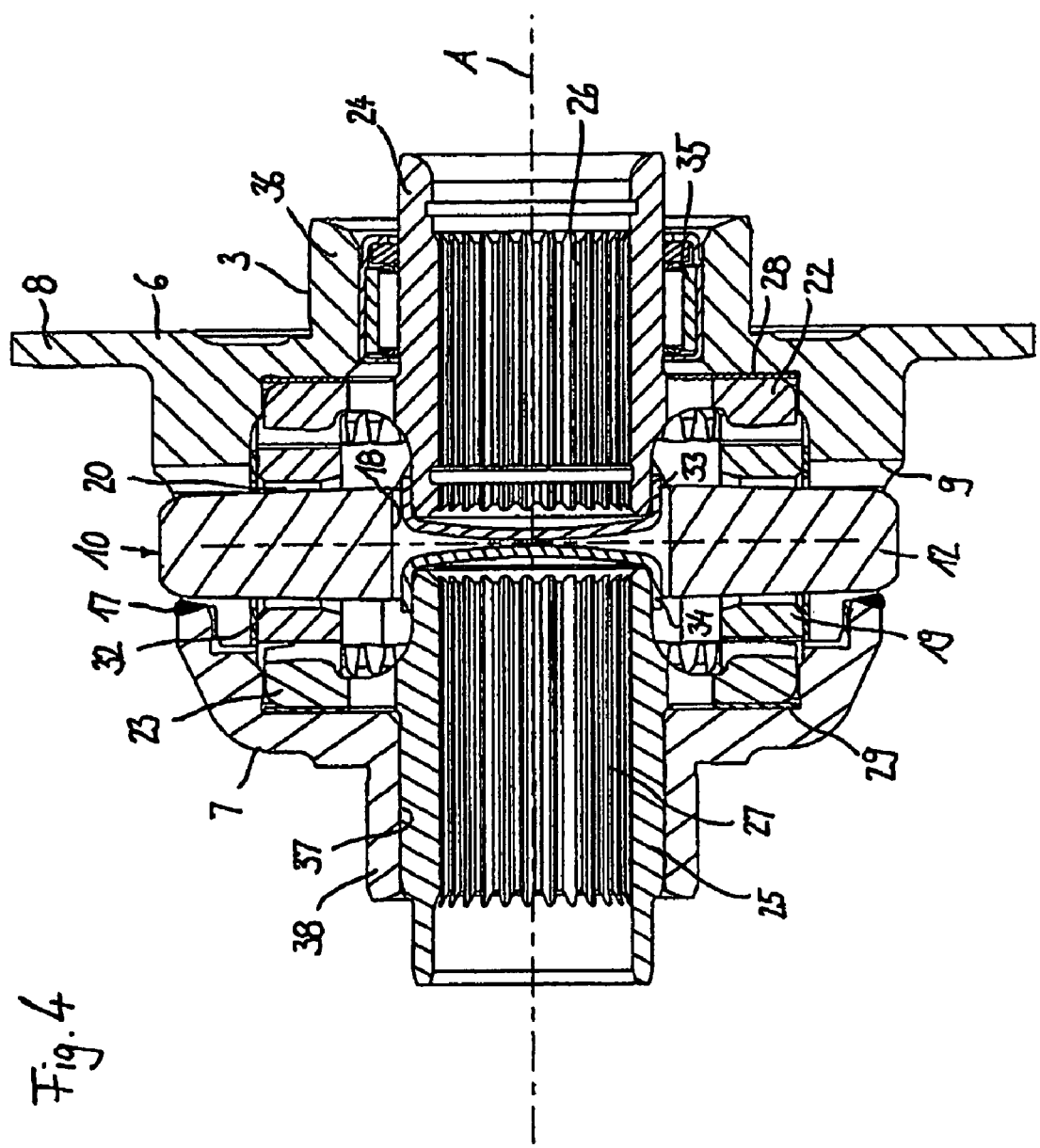
FIG. 4 shows the differential assembly according to FIG. 3 in a longitudinal section in the finish-assembled condition.

FIGS. 3 and 4 which will be described jointly below show the entire differential assembly. The differential carrier contains the supporting element 10 which rotates around the longitudinal axis A jointly with the differential carrier 5. The supporting element 10 is produced so as to be integral and comprises a plurality of journals 12 whose journal axes extend perpendicularly to the axis of rotation A; it also comprises a central aperture 18. The journals 12, which can be provided in any number, with four being provided in the present case, are received in the recesses 9 in the first carrier part 6. On each of the journals 12, there is rotatably supported a differential gear 19, with the bearing being a friction bearing. For lubricating the friction bearing, the journals 12 comprise flattened regions 20 which extend parallel to the journal axis B. The differential gears 19 are axially movably held on the associated journal 12.

The first sideshaft gear 22 and the second sideshaft gear 23 are driven via the supporting element 10 and the differential gears 19. The sideshaft gears 22, 23 are each integrally connected to projecting hubs 24, 25 which are each rotatably supported in an associated carrier part 6, 7, with the hub 24 at the flange end being supported by a rolling contact bearing 35 in a sleeve-shaped projection 36 of the first carrier part 6. The hub 25 at the cover end is supported by a friction bearing 37 in a sleeve-shaped projection 38 of the second carrier part 7. The reason for using a rolling contact bearing 35 for supporting the hub 24 at the flange end is that said hub 24 is to be connected to a constant velocity universal joint so that higher forces have to be supported in the bearing region. This is shown in detail in FIG. 6 which will be described below.

The two sideshaft gears 22, 23 are axially supported against the first and the second carrier part 6, 7, with friction-reducing abutment discs 28, 29 with a radial face each. The differential gears 19 which are floatingly held on the respective journal 12 are supported via abutment discs 31, 32 against the first carrier part 6 in the radial direction with reference to the axis of rotation A. The differential assembly 2 is provided in the form of a crown gear differential, so that the differential gears 19 are provided in the form of spur gears and the sideshaft gears 22 in the form of crown gears. Providing the differential assembly 2 in the form of a crown gear assembly is advantageous in that the forces transmitted from the differential gears 19 to the crown gears 22, 23 comprise only axial components with reference to the axis of rotation A. There does not occur any radial components which would have to be accommodated by the differential carrier 5. The wear between the differential gears 19 and the abutment discs 31, 32 is thus minimized.

The two sideshaft gears 22, 23 each comprise a hub 24, 25 with inner teeth 26, 27 into which it is possible to insert sideshafts (not shown) in a rotationally fast way for torque transmitting purposes. The length of the inner teeth 26, 27 and thus the length of the hub 24, 25 depends on the torque to be transmitted and on the diameter of the toothing. In order to obtain an axially short differential assembly, the two hubs 24, 25 project into the central aperture 18 of the star-shaped supporting element 10, with the diameter of the aperture 18 having been selected to be such that there remains an annular gap between the hubs 24, 25 and the carrying element 10 to enable the supporting element 10 to be freely centered during assembly on the axis of rotation A. Furthermore, it is thus possible to have rough production tolerances of the hubs 24, 25. At their opposed ends, the hubs 24, 25 are closed by cover parts 33, 34 which can be produced in the form of formed plate metal parts for example. The cover parts 33, 34 prevent transmission oil from flowing out of the differential assembly 2 into the toothed region.

For the purposes of assembly which preferably takes place with the axis of rotation extending in the vertical direction, first the sideshaft gear 22 at the flange end is inserted into the sleeve-shaped projection 36 of the first carrier part 6, with an abutment disc 28 being arranged therebetween. Subsequently, the differential gears 19 are slid on to the journal 12 of the supporting element 10 and then, the unit consisting of the supporting element 10 and the differential gears 19 is inserted into the first carrier part 6, with the differential gears 19 being made to engage the sideshaft gears 22. Furthermore, the second sideshaft gear 23 is placed on to the differential gears 19 and made to engage same. Thereafter, the second carrier part 7 is slid in to the first carrier part 6, with the abutment disc 29 being arranged therebetween, with the cylindrical projection 14 engaging the annular recess 19 to enable the two carrier parts 6, 7 to be centered relative to one another. Finally, the join formed between the first annular face 13 and the second annular face 15 is closed by a weld 17. Before the welding operation takes place, the first and the second carrier part 6, 7 are axially aligned relative to one another in such a way that a tooth play is set between the differential gears 19 and the sideshaft gears 22, 23. Any welding method can be used for connecting the two carrier parts 6, 7. Because the recesses 9 for receiving the journals 12 are formed in the first carrier part 6 only, the second carrier part 7 comprises a simple design, with the second annular face 15 of the carrier part 7 being continuously closed. The procedure and expenditure of producing and assembling the inventive differential assembly, in total, are minimized.

Figure 5:
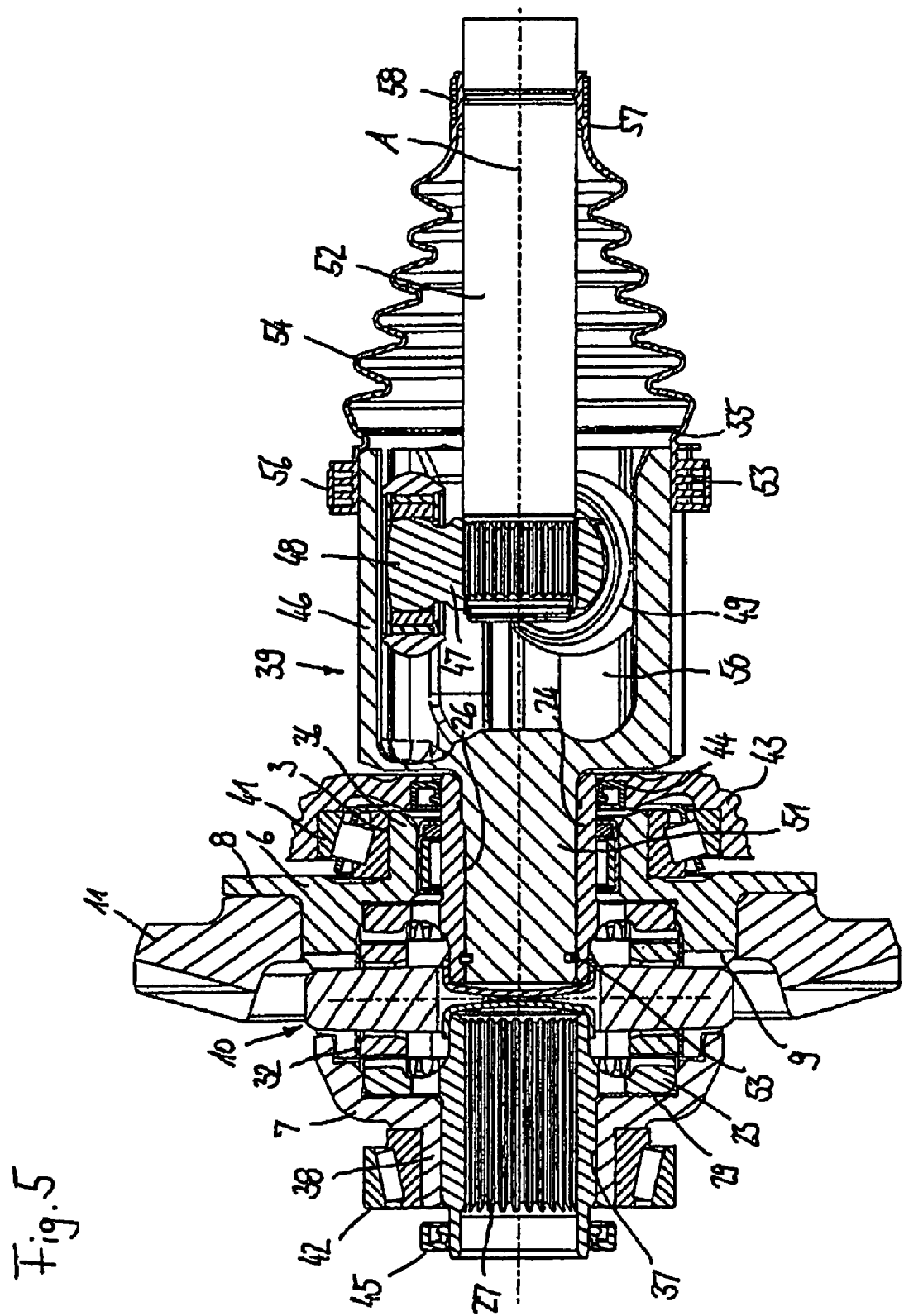
FIG. 5 shows the differential assembly according to FIG. 4 in the built-in condition with a tripode joint.

FIG. 5 shows the differential assembly 2 in the built in condition with a connected constant velocity joint 39. Such differential assemblies with a constant velocity joint 39 connected on one side are used particularly in drivelines of motor vehicles, having a driveshaft which is arranged so as to be offset eccentrically with reference to a longitudinal vehicle axis, as is the case, for example, with front wheel drive motor vehicles with a transversely built in engine. The differential assembly corresponds to that shown in FIGS. 1 to 5, which is reason why reference is made to the above description.

The differential assembly with its sleeve-shaped projections 36, 38 is supported by rolling contact bearings 41, 42 in a stationary drive housing 43 and outwardly sealed by seals 44, 45. To the sideshaft gear 24 at the flange end there is connected the constant velocity plunging joint 39 which is provided in the form of a tripode joint. Tripode joints are known in principle and described in DE 43 14 503 C1 for example to which reference is hereby made. The plunging joint 39 comprises an outer joint part 46 with an integrally formed-on journal 51 with teeth which, for torque transmitting purposes, engages the inner teeth 26 of the hub 24 and is axially secured by a securing ring 53. In addition to the outer joint part 46, the plunging joint 39 comprises a star-shaped inner joint part 37 with three arms 48 on each of which there is rotatably held a roller unit 49. The roller units 49 engage tracks 50 of the outer joint part 46, which extend parallel to the axis of rotation A, for the purpose of transmitting torque to the inner joint part 47. Into the inner joint part 47 there is inserted a sideshaft 52 in a rotationally fast and axially secured way, and the sideshaft 52 is able to carry out angular movements and axial displacement movements relative to the outer joint part 46 whose longitudinal axis coincides with the axis of rotation A of the differential assembly 2. The plunging joint 39 is sealed relative to the environment by a convoluted boot 54 which, with a first collar 55, is sealingly attached to the outer joint part 46 by means of a clamping strip 56 and which, with a second collar 57, by means of a clamping strip 58, is sealingly attached to the sideshaft 52. The first collar 56 is connected to an adapter 53 which, on its radial outside, comprises a cylindrical contour and, on its radial inside, a trilobar contour adapted to the cross-section of the outer joint part 46. The convoluted boot 54 extends over the annular chamber between the outer joint part 46 and the sideshaft 52, thus preventing dirt from entering the plunging joint 39 and lubricant from escaping from the plunging joint 39.

The invention claimed is:

1. A differential assembly for use in the driveline of a motor vehicle, comprising:
    a differential carrier which is rotatingly drivable around an axis of rotation (A) and which comprises a dish-shaped first carrier part with a free first annular face and a dish-shaped second carrier part connectable to the first carrier part and having a free second annular face, wherein a plurality of circumferentially distributed recesses is formed between the first carrier part and the second carrier part;
    a supporting element held in the differential carrier and having a plurality of journals, wherein each of the journals engages one of the recesses of the differential carrier and rotatably carries a differential gear for driving two sideshaft gears;
    wherein the first and the second carrier parts are connected to one another by welding along a joining region formed between the first annular face and the second annular face, wherein a weld is interrupted by the recesses in the circumferential direction, and
    wherein the recesses for receiving the journals are formed in the first carrier part only, and extend from the free first annular face in the axial direction, wherein the second annular face of the second carrier part is closed continuously.

2. A differential assembly according to claim 1, wherein the weld is arranged so as to be axially offset relative to the supporting element.

3. A differential assembly according to claim 1, wherein the second carrier part comprises an annular recess into which the first carrier part is introduced by a cylindrical projection.

4. A differential assembly according to claim 3, wherein centering is effected by the cylindrical projection of the first carrier part and the annular recess of the second carrier part.

5. A differential assembly according to claim 1, wherein the first annular face or the second annular face is conical in shape.

6. A differential assembly according to claim 1, wherein the first carrier part comprises a flange for introducing torque into the differential carrier.

7. A differential assembly according to claim 1, wherein the differential assembly is provided in the form of a crown gear differential.

8. A differential assembly according to claim 1, comprising at least three differential gears, wherein the supporting element is centered on the axis of rotation (A) via a meshing engagement of the differential gears with the sideshaft gears.

9. A differential assembly according to claim 1, wherein the journals of the supporting element, for lubricating purposes, comprise flattened portions extending parallel to a journal axis (B).

10. A differential assembly according to claim 1, wherein the journals are held in the recesses so as to be axially movable with reference to the axis of rotation (A).

11. A differential assembly according to claim 1, wherein each of the two sideshaft gears comprises a hub for transmitting torque to an associated sideshaft which partially projects into a central aperture of the supporting element, wherein a radial gap exists between the respective hub and the supporting element.

12. A differential assembly according to claim 1, wherein at least one of the sideshaft gears is rotatingly supported in the differential carrier by a rolling contact bearing.

13. A differential assembly according to claim 12, wherein the sideshaft gear supported by a rolling contact bearing in the differential carrier can be connected to an outer joint part of a constant velocity universal joint.

* * * * *